US009773307B2

United States Patent
Chang et al.

(10) Patent No.: US 9,773,307 B2
(45) Date of Patent: Sep. 26, 2017

(54) QUANTIFICATION AND IMAGING METHODS AND SYSTEM OF THE ECHO TEXTURE FEATURE

(71) Applicant: AmCad BioMed Corporation, Taipei (TW)

(72) Inventors: King-Jen Chang, Taichung (TW); Argon Chen, Taipei (TW); Chiung-Nein Chen, Taipei (TW); Kuen Yuan Chen, Taipei (TW); Yu-Hsin Wang, Taipei (TW); Kuo-Chen Huang, Taipei (TW)

(73) Assignee: AMCAD BIOMED CORPORATION, Taipei (TW)

( * ) Notice: Subject to any disclaimer, the term of this patent is extended or adjusted under 35 U.S.C. 154(b) by 511 days.

(21) Appl. No.: 14/558,298

(22) Filed: Dec. 2, 2014

(65) Prior Publication Data
US 2015/0086095 A1    Mar. 26, 2015

Related U.S. Application Data

(63) Continuation-in-part of application No. 12/693,253, filed on Jan. 25, 2010, now Pat. No. 8,948,474.

(51) Int. Cl.
G06T 7/40 (2017.01)
G06T 7/00 (2017.01)
G06T 7/41 (2017.01)

(52) U.S. Cl.
CPC .............. *G06T 7/0012* (2013.01); *G06T 7/41* (2017.01); *G06T 2207/10132* (2013.01); *G06T 2207/20104* (2013.01); *G06T 2207/30096* (2013.01)

(58) Field of Classification Search
CPC combination set(s) only.
See application file for complete search history.

(56) References Cited

U.S. PATENT DOCUMENTS 5,224,175 A    6/1993   Gouge et al.
5,743,266 A *  4/1998   Levene .................... A61B 8/06
                                               600/458

(Continued)

OTHER PUBLICATIONS

Extended European Search report issued on Apr. 23, 2015 in corresponding EP patent application No. 14178875.2 (8 pgs.).

(Continued)

*Primary Examiner* — Anand Bhatnagar
(74) *Attorney, Agent, or Firm* — Muncy, Geissler, Olds & Lowe, P.C.

(57) ABSTRACT

The present invention provides quantification and imaging methods and a system of the echo-texture feature, comprising: obtaining an ultrasonic image; calculating all the pixel values in a selected ROI of the ultrasonic image to obtain a regional standard deviation; excluding pixels with a pixel value smaller than a multiple of the regional standard deviation in the selected ROI; counting a set of pixels centered around a $N^{th}$ pixel to gather a $N^{th}$ local mean, a $N^{th}$ local variance and a $N^{th}$ local coefficient of variance corresponding the set of pixel values, wherein N is from 1 to the number of the pixels remaining in the selected ROI; and obtaining an echo-texture index according to the local means, the local variances, or the local coefficient of variances. The imaging of echo texture which shows the echo texture distribution of the selected ROI with a color scale changing continuously from red to blue is also included. A parameter is provided to adjust the visualization enhancement of the echo texture.

20 Claims, 7 Drawing Sheets
(5 of 7 Drawing Sheet(s) Filed in Color)

(56) References Cited

U.S. PATENT DOCUMENTS

| | | | |
|---|---|---|---|
| 6,078,680 A | 6/2000 | Yoshida et al. | |
| 6,137,899 A | 10/2000 | Lee et al. | |
| 6,173,083 B1 | 1/2001 | Avinash | |
| 6,898,303 B2 | 5/2005 | Armato et al. | |
| 7,231,074 B2* | 6/2007 | Raunig | G06K 9/0014 382/128 |
| 7,684,596 B2 | 3/2010 | Watson et al. | |
| 7,689,016 B2 | 3/2010 | Stoecker et al. | |
| 7,822,255 B2 | 10/2010 | Schutz | |
| 8,520,947 B2* | 8/2013 | Saikaly | G06T 7/0012 382/131 |
| 8,744,157 B2 | 6/2014 | Valadez | |
| 2002/0006216 A1 | 1/2002 | Armato et al. | |
| 2003/0223627 A1 | 12/2003 | Yoshida et al. | |
| 2004/0013292 A1* | 1/2004 | Raunig | G06K 9/0014 382/128 |
| 2006/0269111 A1 | 11/2006 | Stoecker et al. | |
| 2007/0083114 A1* | 4/2007 | Yang | A61B 8/00 600/437 |
| 2008/0008369 A1* | 1/2008 | Koptenko | G06K 9/4604 382/128 |
| 2008/0107315 A1* | 5/2008 | Kimmel | G06T 7/143 382/128 |
| 2008/0118136 A1 | 5/2008 | Cai et al. | |
| 2008/0292194 A1* | 11/2008 | Schmidt | G06T 7/0012 382/217 |
| 2008/0317325 A1 | 12/2008 | Ortyn et al. | |
| 2010/0111396 A1 | 5/2010 | Boucheron | |
| 2010/0134517 A1* | 6/2010 | Saikaly | G06T 7/0012 345/619 |
| 2010/0150413 A1 | 6/2010 | Futamura | |
| 2010/0189346 A1* | 7/2010 | Ni | G01S 7/52034 382/164 |
| 2010/0260396 A1 | 10/2010 | Brandt et al. | |
| 2010/0284588 A1 | 11/2010 | Valadez | |
| 2011/0026788 A1 | 2/2011 | Elter et al. | |
| 2011/0096965 A1* | 4/2011 | Ni | G01S 7/52034 382/128 |
| 2016/0188954 A1* | 6/2016 | Ajemba | G06T 7/0012 382/128 |

OTHER PUBLICATIONS

Yair Zimmer, Ron Tepper, Solange Akselrod, "An Automatic Approach for Morphological Analysis and Malignancy Evaluation of Ovarian Masses Using B-Scans", *Ultrasound in Medicine and Biology*, 2003, pp. 1561-1570, 29(11).

Khaled Taouil, Nadra Ben Romdhane, "Automatic Segmentation and classification of Skin Lesion Images, Distributed Frameworks for Multimedia Applications", *The 2$^{nd}$ International Conference on May* 2006, pp. 1-12, Pulau.

Chen et al., "Computerized Detection and Quantification of Microcalcifications in Thyroid Nodules", *Ultrasound in Medicine & Biology*, vol. 27, Issue 6, Jun. 2011; pp. 870-878.

* cited by examiner

QUANTIFICATION AND IMAGING METHODS AND SYSTEM OF THE ECHO TEXTURE FEATURE

FIELD OF THE INVENTION

The present invention relates to a system and a method for quantification and visualization. More particularly, the invention relates to a system and a method for quantifying and visualizing the echo texture feature.

BACKGROUND OF THE INVENTION

Ultrasound imaging is commonly used in medical imaging modality field. Because of the improvement of the image resolution and image digitization and the advantages of the non-invasiveness, the ultrasound imaging has been widely used on the screening and diagnosis of tumors, such as thyroid tumor, by the doctors. Furthermore, the ultrasound imaging is useful for diagnosing the tumors and making the treatment planning.

The ultrasonic feature of echo texture can be used to evaluate the properties of the tumor. Traditionally, the echo texture of the tumor is identified and evaluated by the expert doctors based on their experience. However, slight variations in the texture distribution on the ultrasound image are difficult to be observed and identified by the expert doctor.

Since the personal and subjective experience of each doctor, there are differences in the diagnostic results from doctor to doctor for the same tumor sonography.

Therefore, a scientific and objective quantification method or system, which can precisely analyze the echo texture of the tumor on the ultrasound images, is needed in clinical practice. U.S. Ser. No. 12/693,253 discloses a quantification method and an imaging method capable of quantifying the sonographic features, e.g., margin, cyst, calcification, echogenicity, and heterogeneity, and imaging these sonographic features on the ultrasound images.

The present invention is an extension method and system based on U.S. Ser. No. 12/693,253 to quantify and visualize an echo texture feature (indicating the heterogeneous feature described in U.S. Ser. No. 12/693,253) on the ultrasound image. Furthermore, comparing with the prior art, the present invention would be more powerful and accurate to assist the doctor to make a reliable diagnosis.

SUMMARY OF THE INVENTION

The present invention relates to a system and the method for quantifying and visualizing an echo texture feature (i.e., heterogeneity feature) and provides a quantified index of the echo texture as the reference in the doctor's diagnosis. Moreover, the invention provides the information with the visualization of the echo texture that may improve the diagnostic efficiency of the medical professionals and ease their burden.

The method for quantifying and visualizing an echo texture feature in accordance with the present invention comprises several steps. The method begins with obtaining an ultrasound image including a plurality of pixels, and each pixel on the ultrasound image contains a pixel value. In the next step, a region of interests (ROI) on the ultrasound image may be selected and a regional standard deviation of the pixel values of the pixels in the selected ROI is subsequently determined. Later on, pixels with a pixel value lower than a standard value are eliminated from the selected ROI. In this step, the standard value is a multiple of the regional standard deviation. Then, a set of local statistical parameters, including local mean, local variance, local coefficient of variation and their combination, for each of the pixels remaining in the selected ROI is generated. A $N^{th}$ set of local statistical parameters is calculated by the pixel values of a $N^{th}$ pixel point and the pixel points adjacent the $N^{th}$ pixel, and N here is a natural number from 1 to the number of the pixels remaining in the selected ROI. Finally, at least one echo texture index in accordance with the local statistical parameters is acquired.

The system for quantifying echo texture feature comprises an ultrasound image capture device, an image processing module, a display device, and an input device. The ultrasound image capture device is configured to acquire an ultrasound image comprising a plurality of pixels. Each pixel on the ultrasound image contains a pixel value. The image processing module, connected with the ultrasound image capture device, is configured to receive and process the ultrasound images. Moreover, the image processing module further comprises an analysis unit and a processing unit connected to the analysis unit. The display device, connected with the image processing module, is configured for displaying the ultrasound images. The input device, connected with the image processing module, is configured for defining a region of interests (ROI) on the ultrasound image.

Roles of the analysis unit and the processing unit in an embodied system for quantifying echo texture feature are described in chronological order. Firstly, the analysis unit is configured to receive a selected ROI on the ultrasound image. The processing unit is configured to determine a regional standard deviation of the pixel values in the selected ROI. The analysis unit is further configured to eliminate pixels having a pixel value lower than a standard value, a multiple of the regional standard deviation, from the selected ROI and generate a set of the local statistical parameters for each of the pixels remaining in the selected ROI. A $N^{th}$ set of the local statistical parameters is calculated by the pixel values of the $N^{th}$ pixel point and the pixel points adjacent the $N^{th}$ pixel in the selected ROI. Note that N here is a natural number from 1 to the number of the pixels remaining in the selected ROI. The last role of the processing unit in the embodied system is to obtain at least one echo texture index based on the local statistical parameters.

The system for visualizing echo texture feature comprises an ultrasound image capture device, an image processing module, a display device, and an input device. The ultrasound image capture device is configured to acquire an ultrasound image comprising a plurality of pixels. Each pixel on the ultrasound image contains a pixel value. The image processing module, connected with the ultrasound image capture device, is configured to receive and process the ultrasound images. Moreover, the image processing module further comprises an analysis unit and a processing unit connected to the analysis unit. The display device, connected with the image processing module, is configured for displaying the ultrasound images. The input device, connected with the image processing module, is configured for defining a region of interests (ROI) on the ultrasound image.

Roles of the analysis unit and the processing unit in an embodied system for visualizing echo texture feature are described in chronological order. Firstly, the analysis unit is configured to receive a selected ROI on the ultrasound image. The processing unit is configured to determine a regional standard deviation of the pixel values in the selected ROI. The analysis unit is further configured to eliminate pixels having a pixel value lower than a standard value, a multiple of the regional standard deviation, from the selected ROI and generate a set of local statistical parameters for each of the pixels remaining in the selected ROI. A $N^{th}$ set of the local statistical parameters is calculated by the pixel values of the $N^{th}$ pixel points and the pixel points adjacent the $N^{th}$ pixel in the selected ROI. Note that N here is a natural number from 1 to the number of the pixels remaining in the selected ROi and the local statistical parameters includes a plurality of local means. The processing unit is also configured to obtain at least one echo texture index and at least one echo texture imaging intensity based on the local statistical parameters. The echo texture imaging intensity of one pixel is obtained by the absolute difference between a regional mean computed by the values of the pixels remaining in the selected ROI, and the local mean of that pixel. The last role of the analysis unit in the embodied system is to illustrate a color scale image of echo texture feature in accordance with the at least one echo texture index and the at least one echo texture imaging intensity.

One embodiment of the present invention is to quantify the echo texture and to obtain the echo texture indexes. In clinical practice, the echo texture indexes provide an accuracy of 74.8% on diagnosis of thyroid tumors.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention relates to a system and a method for quantifying and visualizing echo texture feature. More particularly, at least one embodiment relates to a system and a method for quantifying and visualizing echo texture feature. The embodiments and drawings provided here show different aspects of the present invention. However, the present invention is limited to neither the embodiments nor the drawings thereof.

The method for quantifying and visualizing echo texture feature may be implemented on an ultrasound device, an ultrasound device-associated computing system, or the system for quantifying and visualizing echo texture feature described herein. The method of some embodiments may be provided as a program. The program may be stored in a MPU-readable storage medium or a device comprising the MPU-readable storage medium. Examples of the MPU-readable storage medium include, but not be limited to, a floppy disk, a hard disk, a compact disc, a Zip floppy disk, a magneto-optical (MO) disc, an IC chip, a RAM, or any storage medium well-known in the art.

An ultrasound device-associated computing system may comprise a display device, a processor, a RAM, an input device, and a storage device. The input device is configured for inputting information such as images, text, or commands to the computing system. The storage device is configured for storage of system software, application software, user information, or the programs in accordance with some embodiments. The storage device may be a hard disk, a compact disc, or an Internet-based remote database. The RAM is configured for temporary storage of information and ongoing software. The processor is configured for computing and processing information. The display device is configured for displaying the outputted information. The computing system may be used to perform some embodied methods for quantifying and visualizing echo texture feature in accordance with the present invention. In these cases, the programs are loaded into the RAM of the computing system and the computing system may therefore initiate the processes to perform the embodied methods. The computing system may further display the results via the display device or store the results to the storage device.

The following embodiments are mainly based on ultrasound devices and other specific details. However, it will be apparent to one of ordinary skill in the art that the present invention may be practiced without these specific details. In other instances, well-known methods, procedures, components have not been described in detail so as not to unnecessarily obscure aspects of the embodiments.

Figure 1:
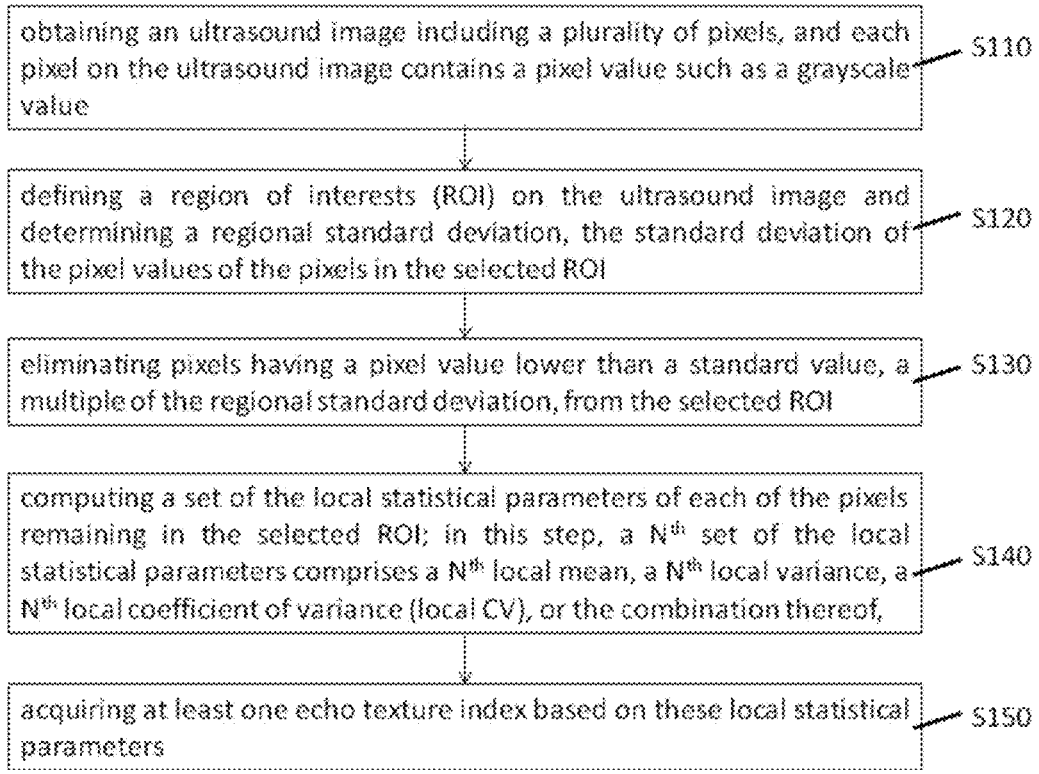
FIG. 1 is a flow diagram illustrating a method for quantifying echo texture feature in accordance with at least one embodiment of the present invention.

FIG. 1 is a flow diagram illustrating a method for quantifying echo texture feature in accordance with at least one embodiment of the present invention. The method is to obtain an echo texture index indicating the ultrasonic texture distribution of an echo region. The method for quantifying echo texture comprises: obtaining an ultrasound image including a plurality of pixels, and each pixel on the ultrasound image contains a pixel value such as a grayscale value (S110); defining a region of interests (ROI) on the ultrasound image and determining a regional standard deviation, the standard deviation of the pixel values of the pixels in the selected ROI (S120); eliminating pixels having a pixel value lower than a standard value, a multiple of the regional standard deviation, from the selected ROI (S130); computing a set of the local statistical parameters of each of the pixels remaining in the selected ROI; in this step, a $N^{th}$ set of the local statistical parameters comprises a $N^{th}$ local mean, a $N^{th}$ local variance, a $N^{th}$ local coefficient of variance (local CV), or the combination thereof, N is a number from 1 to the number of the pixels remaining in the selected ROI (S140); and acquiring at least one echo texture index based on these local statistical parameters (S150).

Figure 2:
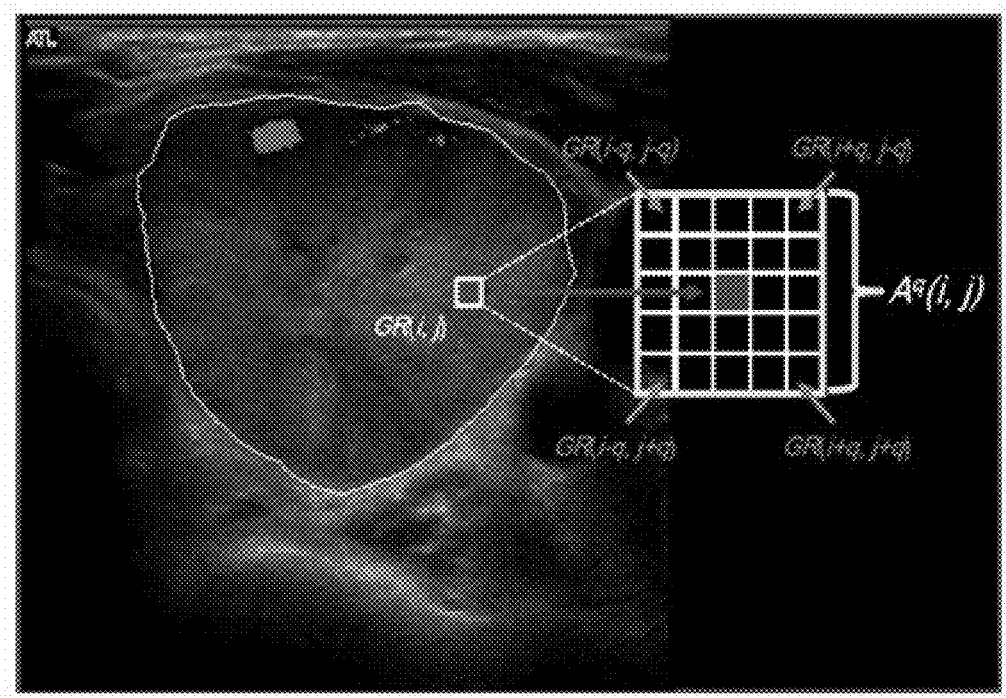
FIG. 2 is an exemplary image comprising a region of interests (ROI) and a pixel set in accordance with at least one embodiment of the present invention.

FIG. 2 is an exemplary image comprising a region of interests (ROI) and a set of pixels in accordance with at least one embodiment of the present invention. After acquiring an ultrasound image by an ultrasound device, a micro processing unit (MPU) in the ultrasound device or an ultrasound device-associated computing system may obtain the ultrasound image from the ultrasound device. The ultrasound image comprises a plurality of pixels, and each pixel contains a pixel value (S110). One may then define or select a region of interests 10, the area enclosed by a white contour in FIG. 2, on the ultrasound image (S120). The region of interests 10 usually is a suspicious area or a region of interest (ROI) to the one who selects. In this embodiment, the ROI is a suspicious area of thyroid tumor. However, an ROI is not limited to the suspicious are of thyroid tumor in other embodiments.

In the next step, a regional standard deviation is determined based on the pixel values of all pixels in the selected ROi 10. As shown in FIG. 2, each block represents a pixel inside the region of interests 10. For a pixel located at (i,j) in the region of interests 10, the pixel is denoted as P(i,j) and the pixel value of P(i,j) is denoted as GR(i,j). The regional standard deviation ($\sigma$) is the standard deviation of GR(i,j) of the pixels in the region of interests 10, is denoted as $\sigma =_{std}(GR(i,j))$. In some embodiments, the regional standard deviation is of all the pixel values in the region of interests 10.

In some embodiments, contour of the region of interests 10 is contracted inwardly to form, for example, an annular region which is about 5-10 pixels in diameter. The contraction may exclude and diminish the interferences of the hypoechoic halo surrounding a thyroid tumor or any artificial variation. The pixels remaining in the redefined region may provide a preferable material for statistics, such as a regional standard deviation.

In some embodiments, pixels with pixel value falling within an interval are eliminated from the region of interests 10 to form a preferable material for statistics. The interval may be defined as, but not be limited to, the pixel values of an anechoic region. In some embodiments, the pixels with pixel value lower than a standard value are eliminated from the selected ROI (S130). The standard value here is defined as a multiple of the regional standard deviation ($\sigma$) and a multiplier (r), which may be described as r×$\sigma$. The multiplier (r) is varied based on the tissue properties of ultrasound imaging.

Then, a set of statistical parameters for each of the pixels remaining in the selected ROI 10 is computed (S140). In some embodiments, the statistical parameters of a $N^{th}$ pixel is computed based on the pixels of a local area which consists of the $N^{th}$ pixel point and the pixel points adjacent the $N^{th}$ pixel. A $N^{th}$ local statistical parameters may include an $N^{th}$ local mean, a $N^{th}$ local variance, a $N^{th}$ local coefficient of variance (local CV), or the combination thereof. In these cases, N is a number from 1 to the number of the pixels remaining in the selected ROI 10. The local area is defined by a mask centered on a pixel. A set of pixels is covered by the mask, the mask may be a square matrix comprised by k columns and k rows. As shown in FIG. 2, the exemplary pixel is P(i,j) and the pixel value of P(i,j) is GR(i,j). Moreover, the local area (mask) of P(i,j) is a 5×5 square matrix. In other embodiments, elements in a square matrix, $A_{i,j}^{q}$, may be denoted as:

$$A_{i,j}^{q} = \begin{Bmatrix} P_{i-q,j-q} & \cdots & P_{i,j-q} & \cdots & P_{i+q,j-q} \\ \vdots & \ddots & \vdots & \cdot\cdot\cdot & \vdots \\ P_{i-q,j} & \cdots & P_{i,j} & \cdots & P_{i+q,j} \\ \vdots & \cdot\cdot\cdot & \vdots & \ddots & \vdots \\ P_{i-q,j+q} & \cdots & P_{i,j+q} & \cdots & P_{i+q,j+q} \end{Bmatrix}$$

The square matrix, $A_{i,j}^{q}$, is a k matrix, and k=2q+1.

Then, at least one echo texture index may be obtained from the statistical parameters of each pixel (S150). The statistical parameters comprise the local mean of each pixel, the local variance of each pixel, the local CV of each pixel, or the combination thereof. The mean of the pixel values of pixels in $Q_{i,j}^{q}$ is defined as a local mean or $$\mu_{A_{i,j}^{q}}^{2},$$

and the full formula is:

$$\mu_{A_{i,j}^{q}}^{2} = \frac{\sum_{i'=i-q}^{i+q} \sum_{j'=j-q}^{j+q} (GR_{i',j'})}{(2q+1)^2}$$

The variance of the pixel values of pixels in $A_{i,j}^{q}$ is defined as a local variance or $$S_{A_{i,j}^{q}}^{2},$$

and the full formula is:

$$S_{A_{i,j}^{q}}^{2} = \frac{\sum_{i'=i-q}^{i+q} \sum_{j'=j-q}^{j+q} \left(GR_{i',j'} - \mu_{A_{i,j}^{q}}^{2}\right)}{(2q+1)^2 - 1}$$

The coefficient of variation of the pixel values of pixels in $A_{i,j}{}^q$ is defined as a local CV or $$CV^2_{A^q_{i,j}},$$

and the full formula is:

$$CV^2_{A^q_{i,j}} = \frac{S^2_{A^q_{i,j}}}{\mu^2_{A^q_{i,j}}} \times 100\%$$

However, the calculations of the statistical parameters will not be processed if a pixel point of the square matrix, $A_{i,j}{}^q$ is outside the region of interests 10.

In some embodiments, the quantification method of the present invention is to obtain an overall echo texture index indicating the ultrasonic texture distribution of an echo area. For example, the local means and the local variances may be further transformed into a mean of the local variances (MOV) or a variance of the local variance (VOV), and the echo texture index may be the MOV, the VOV, or the result of Sqrt(VOV)/MOV. A high quantified value of echo texture index indicates a heterogeneous texture distribution in the region of interests 10.

In some embodiments, the local CVs may be further transformed into a mean of local CV (MOCV), and the echo texture index may be the MOCV. A high quantified value of echo texture index indicates a heterogeneous texture distribution in the selected ROI 10.

For a region with N pixels remaining in the selected ROI, the formula of a mean of the local variances is:

$$MOV_q = \frac{\sum_{v=1}^{n_q}(S^2_{A^q_v})}{n_q}$$

The formula of the variance of the local variances is:

$$VOV_q = \frac{\sum_{v=1}^{n_q}(S^2_{A^q_v} - \overline{S^2_{A^q_v}})}{n_q - 1}, \text{ and } \overline{S^2_{A^q_v}} = \frac{\sum_{v=1}^{n_q} S^2_{A^q_v}}{n_q}$$

The formula of the mean of local CV is:

$$MOCV_q = \frac{\sum_{v=1}^{n_q} CV^2_{A^q_v}}{n_q}$$

In some embodiments, the quantification method of the present invention is able to obtain the echo texture index of the local area of each pixel within the selected ROI 10. The echo texture index is used for evaluating the local ultrasonic texture distribution of a local echo area in these cases. Visualization of the local echo texture index of each pixel may generate an image of echo texture. The visualized image of echo texture may assist the medical professionals in interpreting and diagnosing, and ease the burden of medical professions.

Based on the aforementioned quantification method, the visualization method of the present invention further comprises several steps, including the procedures for obtaining a regional mean ($\mu'$) and a regional standard deviation ($\sigma'$). The regional mean here is the mean of pixel values of the pixels remaining in the selected ROI 10 after those an echoic pixels were eliminated. The steps also comprise the procedures for illustrating a color scale image of echo texture feature to show the texture information in the region of interests 10. The color scale image of echo texture feature is obtained from the echo texture indexes and echo texture imaging intensities. The echo texture imaging intensity of a pixel is the absolute difference between the regional mean and the local mean of that pixel. The echo texture imaging intensity of P(i,j) is denoted as $T_{i,j}$=Abs(local Mean$_{i,j}$-$\mu'$). The color scale image of echo texture feature may be expressed in colors, for example, a homogeneous texture may be emphasized with blue color, and a heterogeneous texture may be emphasized with red color.

In some embodiments, the visualization method of the present invention further comprises several steps, including procedures for obtaining the visualized value ($V_{i,j}$) of each pixel based on the echo texture imaging intensity, an upper limit (U), and a lower limit (L). The visualized value ($V_{i,j}$) of a pixel is 0 if the echo texture imaging intensity of the pixel exceeds the upper limit. The visualized value ($V_{i,j}$) of a pixel is a pre-determined value if the echo texture imaging intensity of the pixel is lower than the lower limit. However, if the echo texture imaging intensity of a pixel falls within the upper limit and the lower limit, the visualized value ($V_{i,j}$) of that pixel is denoted as (pre-determined value)×(U-$T_{i,j}$)/(U-L). For example, if the pre-determined value is 230 in a case, the visualized value $V_{i,j}$ of a pixel P(i,j) would be:

$$V_{i,j} = \begin{cases} 0, & \text{if } T_{i,j} > U \\ 230, & \text{if } T_{i,j} < L \\ 230 \times (U - T_{i,j})/U - L, & \text{if } L \leq T_{i,j} \leq U \end{cases}$$

In some embodiments, the visualization method of the present invention further comprises several steps, including procedures for determining an upper limit and a lower limit based on the mean of the local variances (MOV) and the variance of the local variances (VOV). The mean of the local variances (MOV) and the variance of the local variances (VOV) are obtained from the local means and the local variances. The mean of the local variances multiplied by the regional standard deviation ($\sigma'$) and further divided by two divisors, the variance of the local variances and an upper bound ($S_1$), results in the upper limit. The mean of the local variances multiplied by the regional standard deviation ($\sigma'$) and further divided by two divisors, the variance of the local variances and a lower bound ($S_2$), results in the lower limit. The upper bound ($S_1$) and the lower bound ($S_2$) are two adjustable factors each falls between 0.5 and 10.0, and the lower bound ($S_2$) is always more than the upper bound ($S_1$). An upper limit (U) and a lower limit (L) may be expressed as:

$$U = (MOV/VOV) \times (\sigma')/(S_1)$$

$$L = (MOV/VOV) \times (\sigma')/(S_2)$$

In some embodiments, the upper limit and the lower limit are determined in part by the mean of local CV (MOCV) obtained from the local CVs. The reciprocal of the mean of local CVs (MOCV) multiplied by the regional standard deviation (σ') and further divided by an upper bound (S₁) results in the upper limit. The reciprocal of the mean of local CVs (MOCV) multiplied by the regional standard deviation (σ') and further divided by a lower bound (S₂) results in the lower limit. The upper bound (S₁) and the lower bound (S₂) are two adjustable factors each falls between 0.5 and 10.0, and the lower bound (S₂) is always more than the upper bound (S₁). The upper limit (U) and the lower limit (L) in these embodiments may be expressed as:

$$U=(1/MOCV) \times (\sigma')/(S_1)$$

$$L=(1/MOCV) \times (\sigma')/(S_2)$$

Figure 3:
FIG. 3 is an exemplary color scale for the imaging of the echo texture feature in accordance with at least one embodiment of the present invention.

FIG. 3 is an exemplary color scale image of echo texture in accordance with at least one embodiment of the present invention. As shown in FIG. 3, the color of each pixel is determined by its visualized value ($V_{i,j}$) and a conversion from the HSV color model to the RGB color model. The colors in a color scale image of echo texture may be expressed in a color scales between red, orange, yellow, green and blue. The collection of each visualized value may form a color scale image of echo texture representing the echo texture distribution of the selected ROI on an ultrasound image.

Figure 4A:
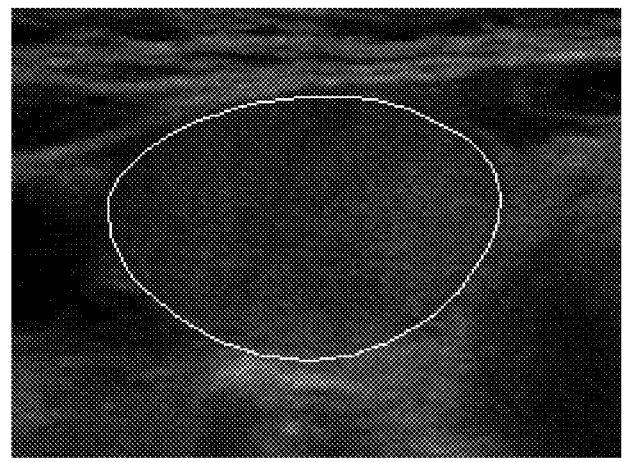
FIG. 4A is an example of an original ultrasound image in accordance with at least one embodiment of the present invention.
Figure 4B:
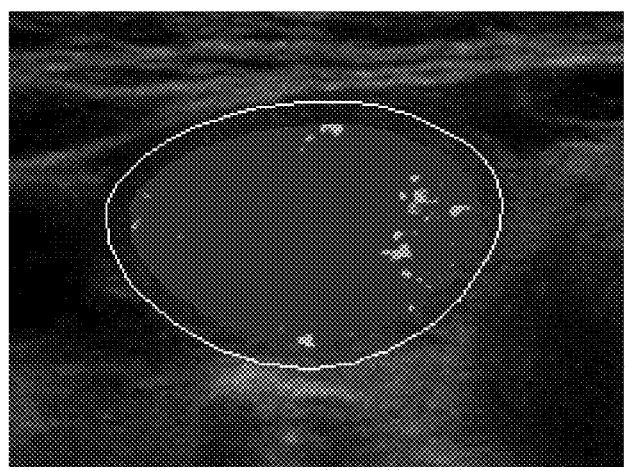
FIG. 4B is an example of a visualized image representing the homogeneous texture distribution of echo texture feature in accordance with at least one embodiment of the present invention.
Figure 5A:
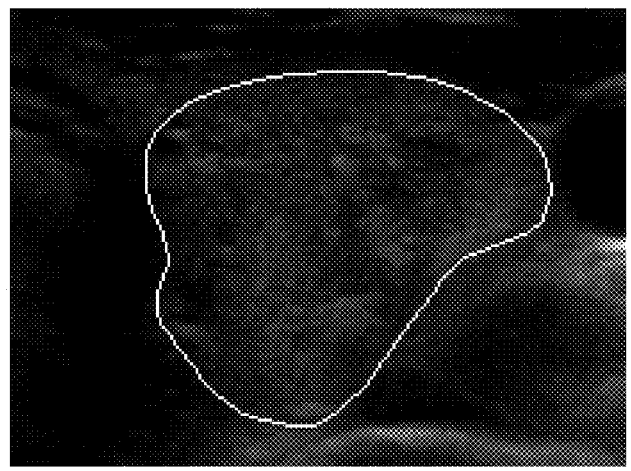
FIG. 5A is an example of an original ultrasound image in accordance with at least one embodiment of the present invention.
Figure 5B:
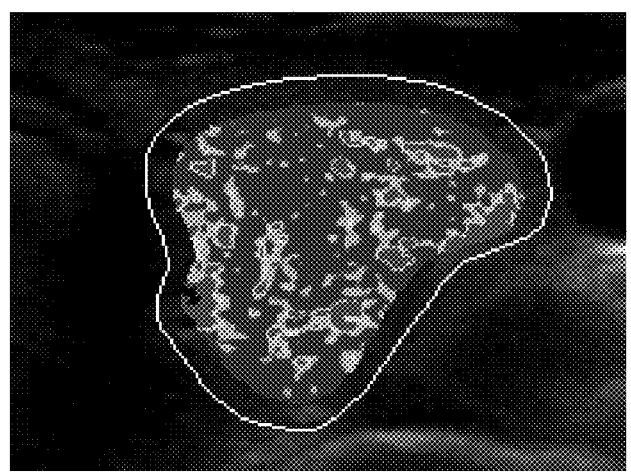
FIG. 5B is an example of a visualized image representing the heterogeneous texture distribution of echo texture feature in accordance with at least one embodiment of the present invention.

As shown in FIG. 4A, FIG. 4B, FIG. 5A, and FIG. 5B, these embodiments indicate that the method in accordance with the present invention provide the visualized images with the smooth color scales and more contrast between the heterogeneous texture and homogeneous texture. FIG. 4A and FIG. 5A represent the original images of FIG. 4B and FIG. 5B respectively. FIG. 4B is an exemplary visualized image to show a large coverage with blue color and represent a case with a homogeneous texture distribution. FIG. 5B is an exemplary visualized image to show a large coverage with red color and represent a case with a heterogeneous texture distribution.

Figure 6A:
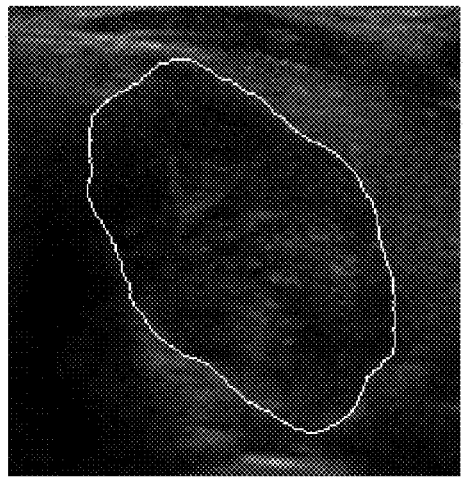
FIG. 6A is an example of an ultrasound image in accordance with at least one embodiment of the present invention.
Figure 6B:
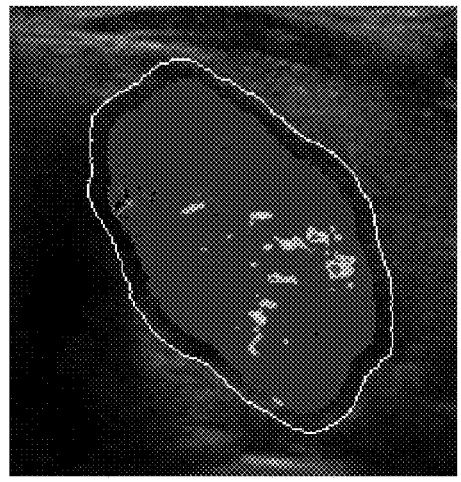
FIG. 6B is an example of a visualized image of the echo texture feature, in a condition that the upper bound ($S_1$) is 1.125 and the lower bound ($S_2$) is 3, in accordance with at least one embodiment of the present invention.
Figure 6C:
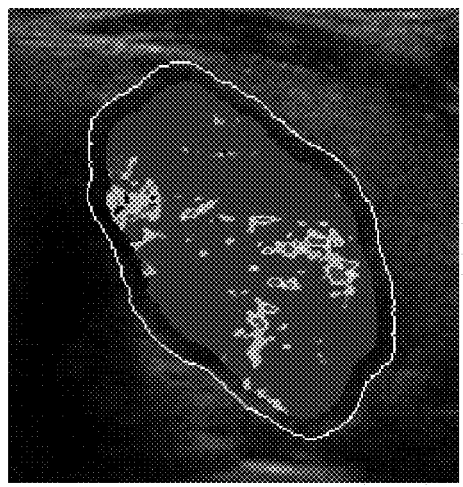
FIG. 6C is an example of a visualized image of the echo texture feature, in a condition that the upper bound ($S_1$) is 1.5 and the lower bound ($S_2$) is 4, in accordance with at least one embodiment of the present invention.
Figure 6D:
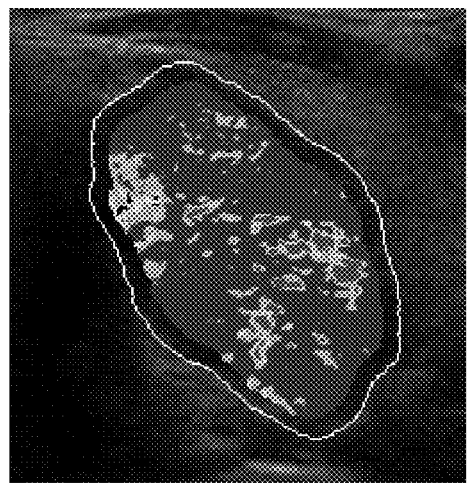
FIG. 6D is an example of a visualized image of the echo texture feature, in a condition that the upper bound ($S_1$) is 1.875 and the lower bound ($S_2$) is 5, in accordance with at least one embodiment of the present invention.

According to FIG. 6A, FIG. 6B, FIG. 6C, and FIG. 6D, the visualization method may enhance the contrast of image by adjusting the upper bound (S₁) and the lower bound (S₂). These embodiments indicate that the visualized image with high upper bound (S₁) and high lower bound (S₂) provides a contrast enhancement image. FIG. 6A represents the original ultrasound image, and the upper bound (S₁) and the lower bound (S₂) were increased as shown in FIG. 6B, FIG. 6C, and FIG. 6D.

Figure 7A:
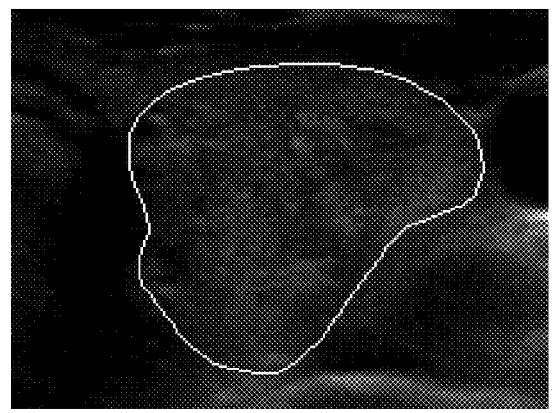
FIG. 7A is an example of an original ultrasound image in accordance with at least one embodiment of the present invention.
Figure 7B:
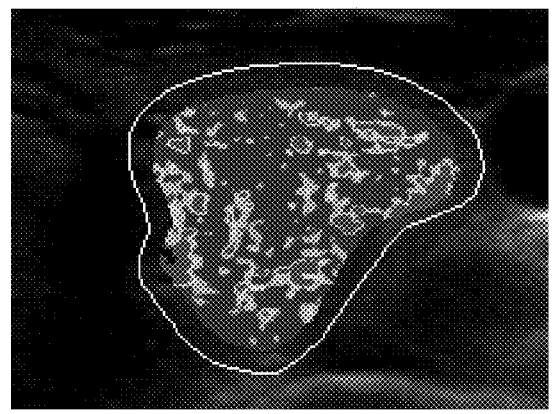
FIG. 7B is an example of a visualized image representing the texture distribution of echo texture feature in accordance with at least one embodiment of the present invention.
Figure 7C:
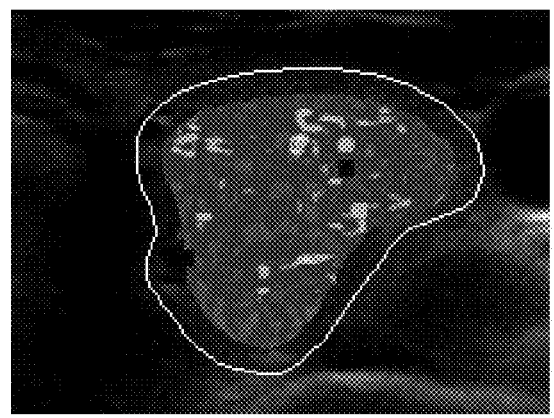
FIG. 7C is an example of a visualized image representing the texture distribution of echo texture feature in accordance with a prior art known in the field.

In some embodiments, the quantification and visualization method comprises steps for obtaining a preferable material for statistics. The steps comprise procedures for excluding regions containing invalid information from the region of interest. The quantification and visualization method also comprises steps for enhancing the contrast to emphasize the patterns in images. The steps comprise procedures for manipulating the adjustable factors, e.g. the upper bound and the lower bound and the procedures for converting the visualized values from the HSV color model to the RGB color model. As shown in FIG. 7A and FIG. 7B, the quantification and visualization method of the present invention provides a way to convert an original image into a contrast enhanced image. The contrast enhanced images may assist medical professions to identify the putative focuses with heterogeneity. Some embodiments of the present invention provide an accuracy of 74.8% on distinguishing the benign thyroid nodules from the malignant thyroid nodules. In contrast to FIG. 7C, an image came from a prior art with an accuracy of 60%, embodiments of the present invention possess large improvements on visualization and provide a clear image displaying the distribution of echo texture feature.

Figure 8:
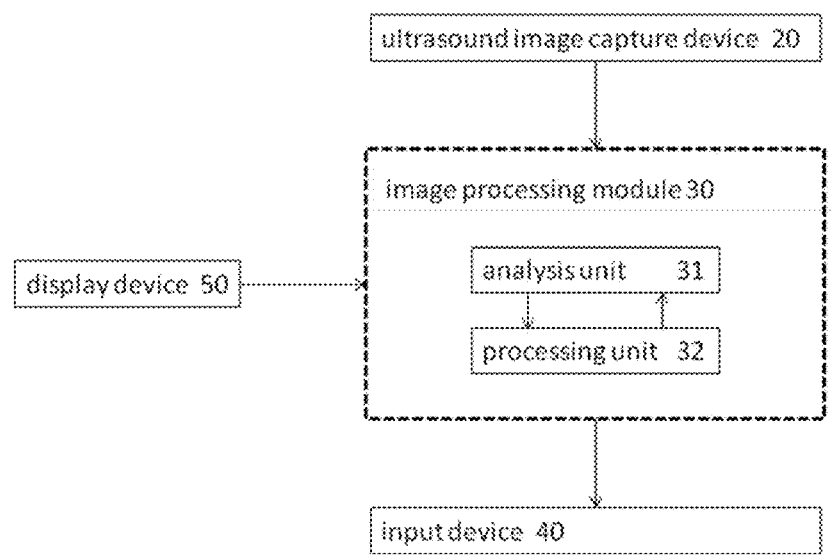
FIG. 8 is a block diagram illustrating a system for quantifying and visualizing echo texture feature in accordance with at least one embodiment of the present invention.

Some embodiments of the present invention relates to a system for quantifying and visualizing the echo texture feature A. The system for quantifying and visualizing the echo texture feature A is configured for executing the aforementioned method for quantifying and visualizing the echo texture feature. The system for quantifying and visualizing the echo texture feature A may be divided as a quantification system and a visualization system. The quantification system and the visualization system comprise the same components but execute the different methods. The quantification system performs the aforementioned method for quantifying the echo texture feature; on the contrary, the visualization system performs the aforementioned method for visualizing the echo texture feature. FIG. 8 is a block diagram illustrating a system for quantifying and visualizing the echo patterns in accordance with at least one embodiment of the present invention. As shown in FIG. 8, the system in some embodiments comprises an ultrasound image capture device 20, an image processing module 30, a display device 50, and an input device 40.

The ultrasound image capture device 20 is configured to acquire ultrasound images. Each ultrasound image comprises a plurality of pixels, and each pixel contains a pixel value such as a gray scale value. The ultrasound image capture device 20 herein may be any ultrasound device capable of taking or capturing ultrasound images.

The image processing module 30 connected with the ultrasound image capture device 20 is configured to receive and process the ultrasound images. The image processing module 30 comprises an analysis unit 31 and a processing unit 32 connected to the analysis unit 31. The image processing module 30 may be any hardware or software devices to process the images and conduct the analysis and process procedures. An exemplary image processing module 30 is the software or the embedded system installed to an ultrasound image capture device 20. Another exemplary image processing module 30 is a computer or a graphics processing unit (GPU).

The display device 50 connected with the image processing module 30 is configured for displaying ultrasound images and the outputted information. The input device 40 connected with the image processing module 30 is configured for defining a region of interests (ROI) on an ultrasound image. The input device 40 may be any equipment to input text, images, or commands. An exemplary input device 40 is a mouse, a keyboard, an electronic writing pad, a touch screen, or a microphone.

The following embodiments involve the system for quantifying echo texture feature in accordance with the present invention. An ultrasound image is displayed on the display device 50. Later on, a region of interests (ROI) on the ultrasound image is selected via the input device 40 and the selected ROI is subsequently received by the analysis unit 31. Then, the processing unit 32 determines a regional standard deviation, i.e. the standard deviation of the pixel values of the pixels in the region of interests. The analysis unit 31 further eliminates some pixels with the pixel value lower than a standard value in the selected ROI. The standard value here is a multiple of the regional standard deviation. Next, the processing unit 32 computes a set of local statistical parameters of each pixels remaining in the region of interests. In this step, an $N^{th}$ set of the local statistical parameters is calculated by the pixel values of the $N^{th}$ pixel point and the pixel points adjacent the $N^{th}$ pixel in the selected ROI, and N represents a natural number from 1 to the number of the pixels remaining in the selected ROI. In the last step, the processing unit 32 acquires at least one echo texture index based on the local statistical parameters. In some embodiments, the local statistical parameters may be a plurality of local coefficient of variances, a plurality of local means, a plurality of local variances, or the combination thereof. The statistical parameter and the echo texture index are obtained by the processing unit 32 in the way disclosed in the aforementioned method for quantifying the echo texture feature.

The following embodiments involve the system for visualizing the echo texture feature in accordance with the present invention. The embodiments comprise three stages and each stage comprises several steps. The first stage begins with an ultrasound image displayed on the display device 50. Later on, a region of interests (ROI) on the ultrasound image is selected via the input device 40 and the selected ROI is subsequently received by the analysis unit 31. Then, the processing unit 32 determines a regional standard deviation, i.e. the standard deviation of the pixel values of the pixels in the region of interests. The analysis unit 31 further excludes some pixels with a pixel value lower than a standard value in the region of interests. The standard value here is a multiple of the regional standard deviation. Next, the processing unit 32 computes a set of local statistical parameters of each of the pixels remaining in the region of interests. In this step, an $N^{th}$ set of the local statistical parameters is calculated by the pixel values of the $N^{th}$ pixel point and the pixel points adjacent the $N^{th}$ pixel in the selected ROI, and N represents a natural number from 1 to the number of pixels remaining in the region of interests. In the last step, the processing unit 32 acquires at least one echo texture index based on the local statistical parameters. Note that in these embodiments, the local statistical parameters comprise at least a plurality of local means. The second stage begins with that the processing unit 32 determines a regional mean, i.e. the mean of the pixel values of the pixels remaining in the region of interests. Afterward, the processing unit 32 further computes the absolute difference between the regional mean and the local mean of each pixel to obtain an echo texture imaging intensity of that pixel. In the last stage, the analysis unit 31 merges the echo texture indexes and the echo texture imaging intensity to illustrate a color scale image of echo texture feature. In some embodiments, the local statistical parameters may further comprise a plurality of local coefficient of variances and a plurality of local variances. The echo texture indexes and the echo texture imaging intensity are obtained by the processing unit 32 in the way disclosed in the aforementioned method for visualizing the echo texture feature.

In some embodiments, a visualized value may be obtained by comparing each texture imaging intensity to an upper limit and a lower limit by the analysis unit 31. The method for acquiring the visualized value and the method for comparing were disclosed in the aforementioned method for visualizing the echo texture feature. The upper limit and the lower limit may be acquired by the processing unit 32 in a way disclosed in the aforementioned method for visualizing the echo texture feature.

What the claims are:

1. A method for quantifying an echo texture feature, comprising:
    obtaining an ultrasound image, wherein the ultrasound image comprises a plurality of pixels, wherein each pixel contains a pixel value;
    defining a region of interests on the ultrasound image and determining a regional standard deviation, wherein the regional standard deviation is the standard deviation of the pixel values of the pixels in the selected ROI;
    eliminating the pixels having the pixel value lower than a standard value in the selected ROI, wherein the standard value is a multiple of the regional standard deviation;
    generating a set of local statistical parameters for each of the pixels remaining in the selected ROI, a $N^{th}$ set of local statistical parameters is obtained from the pixel points within a local area composed of the $N^{th}$ pixel point and the pixel points adjacent the $N^{th}$ pixel in the selected ROI, and the $N^{th}$ pixel is one of the pixels remaining in the selected ROI, N is a natural number from 1 to the number of the pixels remaining in the selected ROI; and
    acquiring at least one echo texture index in accordance with the local statistical parameters.

2. The method as claimed in claim 1, wherein the local statistical parameters comprise a plurality of local coefficient of variances (local CVs), and the at least one echo texture index is a mean of the local CVs (MOCV).

3. The method as claimed in claim 1, wherein the local statistical parameters comprise a plurality of local means and local variances, and the at least one echo texture index is a result of Sqrt(VOV)/MOV, VOV represents the variance of the local variances and MOV represents the mean of the local variances.

4. The method as claimed in claim 1, wherein the local area of the pixels is covered by a k-by-k square matrix, k is a natural number.

5. A method for visualizing the echo texture feature, comprising:
    obtaining an ultrasound image, wherein the ultrasound image comprises a plurality of pixels, wherein each pixel contains a pixel value;
    defining a region of interests (ROI) on the ultrasound image and determining a regional standard deviation, wherein the regional standard deviation is the standard deviation of the pixel values of the pixels in the selected ROI;
    eliminating the pixels having the pixel value lower than a standard value in the selected ROI, Wherein the standard value is a multiple of the regional standard deviation;
    generating a set of local statistical parameters for each of the pixels remaining in the selected ROI, a $N^{th}$ set of local statistical parameters is obtained from the pixels within a local area composed of the $N^{th}$ pixel points and the pixel points adjacent the $N^{th}$ pixel in the selected ROI, and the $N^{th}$ pixel is one of the pixels remaining in the selected ROI, N is a natural number from 1 to the number of the pixels remaining in the region of interests, and the local statistical parameters comprises a plurality of local means; and
    acquiring at least one echo texture index in accordance with the local statistical parameters;
    generating a plurality of echo texture imaging intensities, wherein the each echo texture imaging intensity represents the absolute difference between a regional mean and the local mean of the pixels remaining in the region of interests, and wherein the regional mean is the mean of the pixel values of the pixels remaining in the selected ROI; and illustrating a color scale image of echo texture feature in accordance with the at least one echo texture index and the echo texture imaging intensities.

6. The method as claimed in claim 5, further comprises the steps of:
comparing each echo texture imaging intensity to an upper limit and a lower limit; and
generating visualized values from the step of comparing, wherein each visualized value is generated by the following formula:

$$\text{visualized value} = \begin{cases} 0, & \text{if } T > U \\ PV, & \text{if } T < L \\ PV \times (U-T)/(U-L), & \text{if } L \leq T \leq U \end{cases};$$

wherein PV represents a pre-determined value, T represents the echo texture imaging intensity, U represents the upper limit, and L represents the lower limit.

7. The method as claimed in claim 6, wherein the local statistical parameters comprises local variances and the method further comprises the steps of;
generating a regional standard deviation of the pixels remaining in the selected ROI;
transforming the local means and the local variances to a mean of the local variances (MOV) and a variance of the local variances (VOV); and
determining the upper limit and the lower limit, wherein the upper limit is determined by the following formula:

$U=(MOV/VOV)\times(\sigma')/(S_1),$ and the lower limit is determined by the following formula:

$L=(MOV/VOV)\times(\sigma')/(S_2),$ wherein U represents the upper limit, L represents the lower limit, MOV represents the mean of the local variances, VOV represents the variance of the local variances, σ' represents the regional standard deviation, $S_1$ represents an upper bound, and $S_2$ represents a lower bound.

8. The method as claimed in claim 7, wherein the upper bound and the lower bound are two adjustable factors, and both fall between 0.5 and 10.0, and wherein the lower bound is always greater than the upper bound.

9. The method as claimed in claim 6, wherein the local statistical para meters comprises local CVs and the method further comprises the steps of:
generating a regional standard deviation of the pixels remaining in the selected ROI;
transforming the local CVs to a mean of the local CV; and
determining the upper limit and the lower limit, wherein the upper limit is determined by the following formula:

$U=(1/MOCV)\times(\sigma')/(S_1),$ and the lower is determined by the following formula:

$L=(1/MOCV)\times(\sigma')/(S_2),$ wherein U represents the upper limit, L represents the lower limit, MOCV represents the mean of the local CVs, σ' represents the regional standard deviation, $S_1$ represents an upper bound, and $S_2$ represents a lower bound.

10. The method as claimed in claim 9, wherein the upper bound and the lower bound are two adjustable factors, and both fall between 0.5 and 10.0, and wherein the lower bound is always greater than the upper bound.

11. The method as claimed in claim 5, wherein the local area of the pixels is covered by a k-by-k square matrix, wherein k is a natural number.

12. A system for quantifying an echo texture feature, comprising:
an ultrasound image capture device is configured to acquire an ultrasound image, wherein the ultrasound image comprises a plurality of pixels and each pixel contains a pixel value;
an image processing module connects with the ultrasound image capture device is configured to receive and process the ultrasound images, wherein the image processing module further comprises an analysis unit and a processing unit connected to the analysis unit;
a display device connects with the image processing module is configured for display of the ultrasound images; and
an input device connects with the image processing module is configured to define a region of interests (ROI) on an ultrasound image;
wherein the analysis unit is configured to receive the selected ROI, and the processing unit is configured to determine a regional standard deviation of the pixel values of the pixels in the selected ROI;
wherein the analysis unit is further configured to eliminate pixels having the pixel value lower than a standard value, a multiple of the regional standard deviation, in the selected ROI, wherein the analysis unit is yet further configured to generate a set of local statistical parameters for each of the pixels remaining in the selected ROI, and a $N^{th}$ set of local statistical parameters is obtained from the pixels within a local area composed of the $N^{th}$ pixel point and the pixel points adjacent the $N^{th}$ pixel in the selected ROI, and wherein the $N^{th}$ pixel is one of the remaining pixels in the selected ROI, N is a natural number from 1 to the number of the pixels remaining in the selected ROI; and
wherein the processing unit is further configured to obtained at least one echo texture index based on the local statistical parameters.

13. The system as claimed in claim 12, wherein the local statistical parameters comprise a plurality of local coefficient of variances (local CVs), and wherein the at least one echo texture index is a mean of the local CVs (MOCV).

14. The system as claimed in claim 12, wherein the local statistical parameters comprise a plurality of local means and a plurality of local variances, and wherein the at least one echo texture index is the result of Sqrt(VOV)/MOV, and wherein VOV represents the variance of the local variances and MOV represents the mean of the local variances.

15. A system for visualizing an echo texture feature, comprising:
an ultrasound image capture device is configured to acquire an ultrasound image, wherein the ultrasound image comprises a plurality of pixels and each pixel contains a pixel value;
an image processing module connects with the ultrasound image capture device is configured to receive and process ultrasound images, wherein the image processing module further comprises an analysis unit and a processing unit connecting to the analysis unit;
a display device connects with the image processing module is configured for display of the ultrasound images; and an input device connects with the image processing module is configured to define a region of interests (ROI) on an ultrasound image;

wherein the analysis unit is configured to receive the region of interests, and the processing unit is configured to determine a regional standard deviation of the pixel values of the pixels in the selected ROI;

wherein the analysis unit is further configured to eliminate the pixels having the pixel value lower than a standard value, a multiple of the regional standard deviation, in the selected ROI, wherein the analysis unit is yet further configured to generate a set of local statistical parameters for each of the pixels remaining in the selected ROI, a $N^{th}$ set of the local statistical parameters is obtained from the pixels within a local area composed of the $N^{th}$ pixel point and the pixel points adjacent the $N^{th}$ pixel in the selected ROI, N is a natural number from 1 to the number of the pixels remaining in the selected ROI; and wherein the processing unit is further configured to obtained at least one echo texture index based on the local statistical parameters, and wherein the processing unit is yet further configured to obtained echo texture imaging intensities based on the absolute differences between a regional mean and the local mean of each pixel, wherein the regional mean is a mean of the pixels remaining in the selected ROI; and wherein the analysis unit is also configured to illustrate a color scale image of echo texture feature in accordance with the at least one echo texture index and the echo texture imaging intensities.

16. The system as claimed in claim 15, wherein the processing unit is further configured to compare each echo texture imaging intensity to an upper limit and a lower limit, and the processing unit is yet further configured to determine visualized values, and wherein each visualized value is determined by the following formula:

$$\text{visualized value} = \begin{cases} 0, & \text{if } T > U \\ PV, & \text{if } T < L \\ PV \times (U - T)/(U - L), & \text{if } L \le T \le U \end{cases};$$

wherein PV represents a pre-determined value, T represents the echo texture imaging intensity, U represents the upper limit, and L represents the lower limit.

17. The system as claimed in claim 16, wherein the local statistical parameters comprises a plurality of local variances and the processing unit is further configured to generate a regional standard deviation of the pixels in the selected ROI and transform the local means and the local variances to a mean of the local variances (MOV) and a variance of the local variances (VOV), and the processing unit is yet further configured to determine the upper limit and the lower limit, wherein the upper limit is determined by the following formula:

$$U=(MOV/VOV)\times(\sigma')/(S_1),$$

and the lower limit is determined by the following formula:

$$L=(MOV/VOV)\times(\sigma')/(S_2),$$

wherein U represents the upper limit, L represents the lower limit, MOV represents the mean of the local variances, VOV represents the variance of the local variances, $\sigma'$ represents the regional standard deviation, $S_1$ represents an upper bound, and $S_2$ represents a lower bound.

18. The system as claimed in claim 17, wherein the upper bound and the lower bound are two adjustable factors, and both fall between 0.5 and 10.0, and wherein the lower bound is always greater than the upper bound.

19. The system as claimed in claim 16, wherein the local statistical parameters comprises a plurality of local variances and the processing unit is further configured to generate a regional standard deviation of the pixels remaining in the selected ROI and transform the local CVs to a mean of the local CVs (MOCV), and the processing unit is yet further configured to determine the upper limit and the lower limit, wherein the upper limit is determined by the following formula:

$$U=(1/MOCV)\times(\sigma')/(S_1),$$

and the lower limit is determined by the following formula:

$$L=(MOCV)\times(\sigma')/(S_2),$$

wherein U represents the upper limit, L represents the lower limit, MOCV represents the mean of the local CVs, $\sigma'$ represents the regional standard deviation, $S_1$ represents an upper bound, and $S_2$ represents a lower bound.

20. The system as claimed in claim 19, wherein the upper bound and the lower bound are two adjustable factors, and both fall between 0.5 and 10.0, and wherein the lower bound is always greater than the upper bound.

* * * * *